Oct. 11, 1938.  C. A. ARENS  2,132,919
CONTROL MECHANISM
Filed June 4, 1934
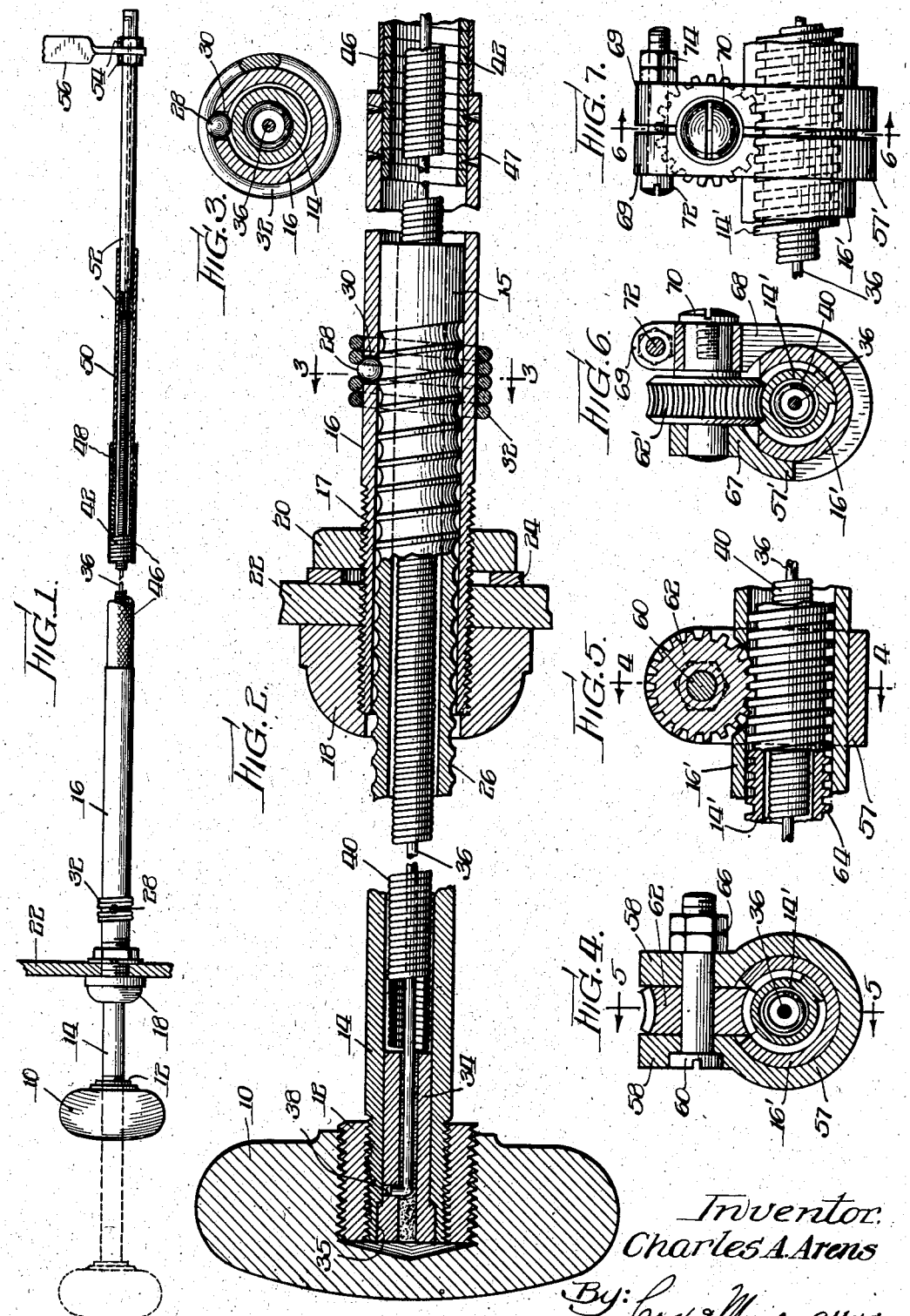
Inventor:
Charles A. Arens
By: Cox & Moore attys.

Patented Oct. 11, 1938

2,132,919

UNITED STATES PATENT OFFICE 2,132,919

CONTROL MECHANISM

Charles A. Arens, Chicago, Ill.

Application June 4, 1934, Serial No. 728,853

10 Claims. (Cl. 74—502)

This invention relates to control mechanism for moving a controlled or actuated element rapidly through a relatively wide range of movement but having provisions for moving the controlled element accurately and slowly to afford a fine or so-called micrometer adjustment at any point throughout said range of movement. The invention is particularly useful for controlling devices such as carburetors, for example, on aircraft, or for controlling the tuning or volume adjustments of radios. But it is to be understood that the invention has a general application to any type of control wherein the specified types of adjustment are desirable.

It is an object of the invention to provide a control mechanism by which a controlled or actuated element may be moved rapidly throughout a wide range of movement but by which the controlled element may be moved slowly and accurately at any point within said range of movement.

It is another object of the invention to provide a new and improved control mechanism particularly adapted to adjustment of carburetor controls, radio controls, and the like, but also general utility, which may be readily and cheaply constructed and which is durable and wholly efficient in operation.

It is another object of the invention to provide a control mechanism in which the control handle may be moved in one manner to move the controlled or actuated element rapidly through a given range of movement and in which the control handle may be moved in another manner to move the controlled element slowly and accurately at any point within said range of movement to effect micrometer adjustments.

It is a further object of the invention to provide a control mechanism in which a control knob may be displaced longitudinally to move a controlled element rapidly through a given range of movement and in which the control knob may be rotated to impart a relatively fine adjustment to said controlled element at any point throughout said range of movement.

It is a still further object to provide in such a control mechanism, means whereby the resistance imparted to the longitudinal movement of the control handle is invariable during operation, but also adjustable.

Other objects and advantages of the invention will be apparent from the following description taken in connection with the drawing wherein certain preferred embodiments of the invention are specifically disclosed.

In the drawing:

Fig. 1 is an assembly view of one form of control mechanism embodying the invention.

Fig. 2 is an enlarged sectional view of a part of the control mechanism shown in Fig. 1.

Fig. 3 is a sectional view taken along the line 3—3 of Fig. 2 showing the ball retaining and actuating means.

Fig. 4 is a sectional detail taken along the line 4—4 of Fig. 5 showing a modified gear type retaining and actuating means.

Fig. 5 is a sectional view of the device shown in Fig. 4 taken along the line 5—5 of Fig. 4.

Fig. 6 is a sectional view taken along the line 6—6 of Fig. 7 showing a retaining and actuating means similar to that shown in Figs. 4 and 5 but employing a modified type of mounting, and Fig. 7 is a side elevation of the device shown in Fig. 6.

Throughout the drawing like reference numerals refer to like parts.

The invention consists generally in the provision of a control device embodying provisions for moving a controlled or actuated element rapidly and readily through a relatively wide range of movement but incorporating provisions for accurately adjusting said controlled element within very fine limits anywhere within said range of movement. In the forms of my invention which I have shown in the drawing for purposes of illustration I provide a control knob which may be moved bodily to move the controlled element correspondingly rapidly and readily through a relatively wide range of movement, but which may be rotated in any position to afford fine adjustment of the controlled element in such position.

Referring now to the drawing, and particularly to that embodiment used for illustration which I have shown in Figs. 1, 2 and 3, numeral 10 denotes a suitable control knob which is adapted to be grasped by the hand of an operator and displaced bodily from its full line position to its dotted line position, as shown in Fig. 1, or rotated about its central axis. Threaded within the control knob 10 is a cylindrical collar 12 which carries threads upon its inner as well as its outer surface and has threaded therein a long sleeve member 14. The collar 12 is used merely as a convenient means for mounting the sleeve 14 rigidly within the control knob 10 and during normal operation of the device the parts 10, 12 and 14 are relatively immovable.

The sleeve 14 is journalled within a sleeve 16, the surface 15 of the sleeve 14 furnishing a good bearing surface. The sleeve 16 is threaded at 17 at its end nearest the control knob, as shown in Fig. 2, and carried by the threads 17 are two cooperating nuts 18 and 20. These two nuts may be rotated in opposite directions being thereby moved together to clamp between them the control panel 22 upon which the control device is mounted and by which it is supported. A suitable lock washer 24 is arranged between the control panel 22 and the nut 20 to insure that the parts will not come loose by vibration or the like. The nuts 18 and 20 and the lock washer 24 constitute a convenient means for securing the sleeve 16 rigidly to the control panel 22. Other equivalent mounting means could be provided.

Cut along the surface of the sleeve member 14 to the left of the bearing portion 15, as shown in Fig. 2, is a helically arranged screw thread 26. The cross-section of the thread is such that it just fits the exterior surface of a ball 28, which engages with the screw thread 26 through a suitable circular opening 30 cut in the outer sleeve member 16. The ball 28 is yieldingly urged into engagement with the screw thread by means of a spring 32 which encircles the sleeve 16. In assembling these parts the spring 32, the convolutions of which tend to press resiliently against each other in non-separated relation, is slipped over the sleeve 16 until the center of the spring lies over the hole 30 in the sleeve. The center convolutions of the spring are then forced apart and the ball 28 dropped into the hole 30 into position. Upon release, the convolutions of the spring tend to assume their normal contacting position, thus resiliently urging the ball into engagement with the screw thread 26. It is obvious that the force with which the ball is urged into engagement with the screw thread may be adjusted by varying the strength of the spring utilized.

Within the sleeve 14 at the end adjacent and within the control knob is a cylindrical member 34, and the sleeve 14 is rotatable upon member 34. The member 34 has an enlarged portion 35 at its end which cooperates with a similarly enlarged portion on the sleeve 14 which prevents the member 34 from moving longitudinally to the right with respect to the sleeve, as shown in Fig. 2. The end of the enlarged portion 35 abuts the body of the control knob, thereby holding the member 34 from longitudinal displacement to the left with respect to sleeve 14. Rigidly secured within the hollow central portion of member 34 is a flexible wire or cable 36 of suitable construction. Any convenient means may be used for securing the cable within the member 34 and one satisfactory means, as shown in Fig. 2, consists in bending the end of it into a hole 38 cut within the member 34. Solder is then poured into the hole 38 and into the central hollow portion of the member 34, forming a seal and a securing means for rigidly securing the cable to the member. Encircling the wire or cable 36 is a flexible, helically coiled wire 40. The parts 36 and 40 constitute a flexible connecting means capable of transmitting longitudinal force. The wire coil 40 abuts at its end adjacent the control knob against the member 34.

Rigidly secured within the sleeve 16 at its end farthest removed from the control handle, is a sheath 42 for the wire coil 40. The sheath 42 may be conveniently formed as shown by winding a wire of suitable cross-section into a helical coil. The sheath 42 may be secured within the sleeve 16 by projections 44 struck inwardly from the sleeve, and the sheath 42 may be covered by fabric tape or the like, 46.

Parts 46, 42, 40 and 36 may be extended to any convenient length and constitute a suitable flexible connection between the control handle on the control panel and the actuated or controlled element.

Rigidly secured upon the sheath 42 at its end near the actuated element is a sleeve 48 which carries rigidly within it a second sleeve 50. Slidable within sleeve 50 is a cylindrical member 52 having a central hollow portion within which the wire 36 is rigidly secured by a connection similar to the connection between the other end of wire 36 and member 34. Nuts 54 threaded upon member 52 secure the controlled or actuated element 56 rigidly thereon. The wire coil 40 abuts the member 52 at its right end, as shown in Fig. 1, similarly to the manner in which the other end of the coil abuts member 34.

The wire coil 40, the sheath 42 and fabric covering 46, together with the sleeves 48 and 50 and member 52, constitute merely a convenient and satisfactory means for protecting the control wire 36 and flexibly extending it from the control knob to the controlled element 56. It is obvious that other equivalent means could be provided.

The operation of my improved control device is as follows: The control knob 10 may be grasped by the operator and moved bodily with respect to the control panel 22 from its full line position, as shown in Fig. 1 to its dotted line position, or it may be displaced only partly through this range of movement as desired. Due to the connection formed by the wire 36, the controlled member 56 partakes of any displacement imparted to the control knob. During such displacement of the control knob the sleeve 14 to which it is rigidly secured is correspondingly displaced longitudinally with respect to sleeve 16 fixed to the control panel, and during this action the ball 28 yields and snaps from thread to thread along the threaded portion 26, being held resiliently in engagement with the threads by the spring 32. There is no rotation of any of the parts during this operation.

At any point throughout the range of movement of the control knob a very fine and accurate or so-called micrometer adjustment may be imparted to the controlled element or member 56 merely by rotating the knob. Upon rotation of the knob inner sleeve member 14 rigidly secured to the knob rotates with respect to outer sleeve member 16 rigidly carried by the control panel 22. By reason of the engagement of ball 28 with screw thread 26, such relative rotation between sleeves 16 and 14 produces a relative longitudinal movement between these parts by screw thread action and, inasmuch as sleeve 16 is fixed longitudinally with respect to the control panel, longitudinal movement is imparted to sleeve 14, to the control knob 10, and by virtue of wire 36, to the controlled member 56. The pitch of the thread 26 determines the amount of longitudinal displacement which will be imparted to sleeve 14 upon any given rotational movement of the control knob. It will thus be seen that a means is provided for imparting accurate and relatively small adjustments to controlled member 56 by relatively large and easily controlled rotation of knob 10. When the control knob is rotated, although sleeve 14 rotates, the parts 34, 40, 36, 52 and 54 do not rotate due to the fact that members 34 and 14 are relatively rotatable although not relatively displaceable longitudinally.

By suitably determining the pitch of the thread 26 such adjustments of element 56 may be made as accurate and small as desired for any normal rotational movement imparted to the control knob 10. A spring 32 is selected which is not strong enough to seriously interfere with the longitudinal displacement movement of the control knob.

The spring will be strong enough however, to hold the ball within a thread upon relative rotation of sleeves 14 and 16, to produce longitudinal movement of sleeve 14. If the control device is applied to a controlled member 56 which requires considerable force to move it, the action of the spring may be aided during rotation of the control knob by a slight longitudinal thrust of the operator's hand upon the control knob during rotation in the direction in which the control knob is to be moved by the action of the ball on the threads.

In Figs. 4 and 5 there is disclosed a modified arrangement for imparting longitudinal movement to sleeve 14 upon rotation of the control knob, a frictionally mounted gear being substituted for ball 28. In this embodiment the sleeve member 16' similar to sleeve 16 in Figs. 1, 2 and 3, carries a clamp comprising a circular body portion 57 securely embracing the sleeve 16' which has upstanding from it extensions 58 located longitudinally of the sleeve approximately in the same position as the hole 30 in the embodiment of Figs. 1, 2 and 3. Carried by the extensions 58 is a bolt 60 upon which is rotatably mounted a gear wheel 62. Cut in the sleeve 14' is a helical thread 64 similar to the thread 26 in sleeve 14 of Figs. 1, 2 and 3, except that the shape of the thread is such that it is adapted to fit with threads cut upon the gear wheel 62. The thread 64 and gear 62 form essentially a worm gear and worm wheel arrangement. Gear 62 engages thread 64 through an opening cut in sleeve 16'. Nuts 66 are provided upon bolt 60, and by their adjustment substantially any desired frictional drag may be placed upon gear wheel 62 by drawing the extensions 58 against the sides of the gear wheel.

The operation of the device of Figs. 4 and 5 is substantially the same as that disclosed in Figs. 1, 2 and 3, that is, on imparting a bodily longitudinal movement to the control member 10, the sleeve 14' is displaced longitudinally with respect to the fixed sleeve 16', the gear wheel 62 frictionally rotating upon its axis during this operation to accommodate movement of the sleeve 14'. The frictional drag imparted to gear wheel 62 by adjustment of nut 66 is not sufficient to prevent this relative displacement of the sleeves. However, upon rotation of the control knob and sleeve 14' with respect to sleeve 16', the frictional drag upon gear wheel 62 holds it stationary so that sleeve 14' is moved longitudinally by screw thread action as in the embodiment of Figs. 1, 2 and 3. As previously described, if considerable force is required to move the controlled member any tendency upon the part of the gear wheel 62 to move upon rotation of the control knob 10 may be avoided by the operator applying longitudinal force to the control knob in the direction in which it is to move.

An advantage is provided by the construction shown in Figs. 4 and 5 over that of Figs. 1, 2 and 3 which may be very material in some instances. This advantage resides in the fact that upon the longitudinal displacement adjustment of the control knob the gear wheel 62 imparts a uniform resistance to the movement of the control knob and therefore does not interfere with accurate adjustment. In the embodiment of Figs. 1, 2 and 3 the ball 28 jumps from thread to thread producing an uneven resistance to longitudinal displacement of the control knob, and further determines minimum increments of movement through which the control knob must be displaced.

In Figs. 6 and 7 there is shown an embodiment much like that of Figs. 4 and 5 and employing a similar frictionally mounted gear. However, a slightly different means for adjusting the frictional drag upon the gear wheel is provided. In this embodiment the clamp 57' secured to the sleeve 16' has an upstanding single extension 67 and a bifurcated extension 68 forming two upstanding parts 69 separated slightly, as shown in Fig. 7. The bolt 70, upon which the gear wheel 62' is in this instance fixedly mounted, is journalled within the extension 67 and between the extensions 69. A second bolt 72 passes through the extensions 69 and upon the end of this bolt are nuts 74 by which the extensions 69 may be brought together to clamp against the bolt 70 and thereby adjust the frictional resistance to rotation of the gear wheel 62'. The operation of this embodiment of the invention except for the difference in the means for adjusting the frictional resistance of gear wheel 62' is the same as is the operation of the embodiment shown in Figs. 4 and 5.

The invention thus provides means for readily and quickly moving a controlled element throughout a wide range of movement but also provides means for imparting accurate and fine adjustments to the controlled element at any point within such range of movement. The invention has particular applicability, for example, to the adjustment of carburetors or throttle valves, particularly in aircraft. When used in connection with aircraft, control panel 22 would be the ordinary control panel of the aircraft, and controlled member 56 would be the throttle valve or carburetor control of the aircraft engine. By bodily displacement of the control knob 10 longitudinally the engine could be operated throughout its entire power range readily and quickly. However, at any given position of the control the member 56 could be accurately and finely adjusted by rotation of control knob 10 to produce the precise and exact engine speed wanted. This is a material advantage. With ordinary control mechanisms it is impossible to secure a precise and accurate engine speed and still have flexibility of control which allows rapid control adjustment throughout the entire engine power range. The invention likewise has particular applicability to the control devices of radios wherein, for example, it is necessary and desirable to tune or adjust volume rapidly throughout a wide range and yet have provision for making accurate or so-called micrometer adjustments at any point within that range. The invention however relates to control mechanisms broadly and is by no means limited in use to aircraft, engines, or radios. It is of general utility.

It is obvious that various changes may be made in the specific embodiments of my invention which I have used for illustrative purposes and I therefore do not wish to be limited to the precise construction shown, but only as indicated in the following claims.

I claim:

1. In a control mechanism, a movable control device, and means for controlling the movements of the control device, said means comprising a member adapted for rotational movement and for longitudinal displacement, said member having a screw thread thereon, a rotatable reactance device in engagement with said screw thread, said reactance device being rotatable by the screw thread as said member is longitudinally displaced without rotation, and means for imparting uniform resistance to rotation of the reactance device whereby to impart uniform resistance to such longitudinal displacement of said member, said resistance means also serving to hold the reactance device against rotation during rotation of the screw thread member whereby to impart longitudinal displacement to the member during rotation thereof.

2. In a control mechanism, a movable control device, and means for controlling the movements of the control device, said means comprising a member adapted for rotational movement and for longitudinal displacement, said member having a screw thread thereon, a rotatable reactance device in engagement with said screw thread, said reactance device being rotatable by the screw thread as said member is longitudinally displaced without rotation, and means for imparting frictional resistance to rotation of the reactance device whereby to impart resistance to such longitudinal displacement of said member, said frictional resistance means also serving to hold the reactance device against rotation during rotation of the screw thread member whereby to impart longitudinal displacement to the member during rotation thereof.

3. In a control mechanism, a movable control device, and means for controlling the movements of the control device, said means comprising a member adapted for rotational movement and for longitudinal displacement, said member having a screw thread thereon, a rotatable reactance device in engagement with said screw thread, said reactance device being rotatable by the screw thread as said member is longitudinally displaced without rotation, means for imparting uniform frictional resistance to rotation of the reactance device whereby to impart uniform resistance to such longitudinal displacement of said member, said frictional resistance means also serving to hold the reactance device against rotation during rotation of the screw thread member whereby to impart longitudinal displacement to the member during rotation thereof, and means for adjusting said frictional resistance means.

4. In a control mechanism, a movable control device, and means for controlling the movements of the control device, said means comprising a member adapted for rotational movement and for longitudinal displacement, said member having a series of control ridges thereon, a rotatable reactance device having a series of cooperating control grooves in engagement with said ridges, said reactance device being rotatable by the ridges as said member is longitudinally displaced without rotation, and means for imparting uniform resistance to rotation of said reactance device whereby to impart uniform resistance to such longitudinal displacement of said member, said resistance means also serving to hold the reactance device against rotation during rotation of said member whereby said member is constrained during rotation thereof for only such longitudinal displacement as is imparted thereto by the control ridges.

5. In a control mechanism, a movable control device, and means for controlling the movements of the control device, said means comprising a member adapted for rotational movement and for longitudinal displacement, said member having a series of control ridges thereon, a gear wheel in engagement with said ridges, said gear wheel being rotatable by the ridges as said member is longitudinally displaced without rotation, and means for imparting frictional resistance to rotation of said gear wheel whereby to impart resistance to such longitudinal displacement of said member, said frictional resistance means also serving to hold the gear wheel against rotation during rotation of said member whereby said member is constrained during rotation thereof for only such longitudinal displacement as is imparted thereto by the control ridges.

6. In a control mechanism, a movable control handle, and means for controlling the movements of the control handle, said means comprising a member capable of rotation and longitudinal displacement only and adapted for movement by the control handle, a friction piece cooperable with said member and maintained in engagement therewith to apply uniform frictional resistance to said member during longitudinal displacement thereof without rotation, said friction piece being yieldable to allow such displacement and being operable by reason of its own engagement with said member to impart longitudinal displacement to the member during rotation of the member.

7. In a control mechanism, a movable control device, and means for controlling the movements of the control device, said means comprising a member adapted for rotational movement and for longitudinal displacement, said member having a screw thread formed thereon, a gear wheel in engagement with said screw thread, and friction means for resisting rotation of said gear wheel.

8. In a control mechanism, a movable control device, and means for controlling the movements of the control device, said means comprising a member adapted for rotational movement and for longitudinal displacement, said member having a screw thread formed thereon, a gear wheel in engagement with said screw thread, friction means for resisting rotation of said gear wheel, and means for adjusting said friction means.

9. Control mechanism comprising a control knob and an actuated member, connections between said control knob and actuated member including a screw thread, said screw thread being rotatable and bodily displaceable by said control knob, a sleeve encircling said screw thread having an opening therein, means carried on said sleeve having upstanding projections, a gear wheel mounted between said projections and engaging said screw thread through said opening in the sleeve, and means for resisting rotation of said gear wheel, said means comprising a friction clamp device, and an adjustment screw for varying the pressure applied by said clamp.

10. In a control mechanism for aircraft engines, a control handle, an engine power control member, a wire secured at one end to said control handle and at the other end to said control member, a sleeve encircling said wire having a screw thread cut therein, a second sleeve encircling said first mentioned sleeve having an opening therein, a gear wheel engaging said screw thread through said opening, and means for resisting movement of said gear wheel, said means comprising a friction clamp device, and an adjustment screw for varying the pressure applied by said clamp.

CHARLES A. ARENS.